(No Model.) 2 Sheets—Sheet 1.
H. HENCKE.
PROCESS OF AND APPARATUS FOR PRODUCING FODDER FROM RESIDUAL PRODUCTS OF DISTILLERIES AND BREWERIES.
No. 316,145. Patented Apr. 21, 1885.
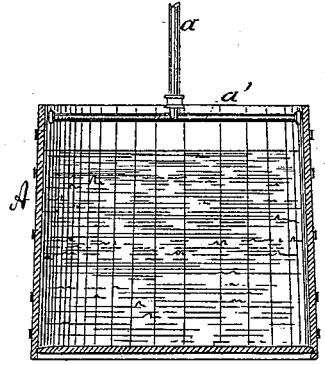
Fig. I.
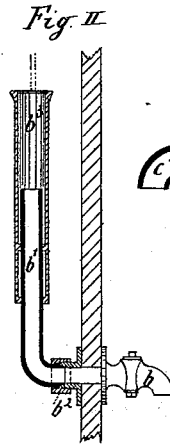
Fig. II.
Fig. V.
Fig. IV.
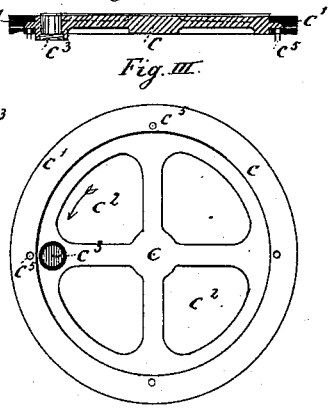
Fig. III.
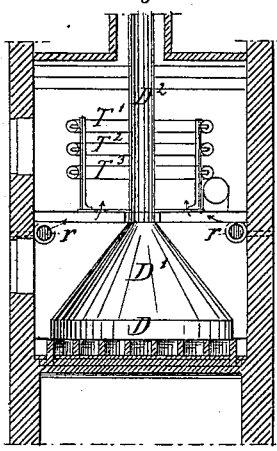
Fig. VI.
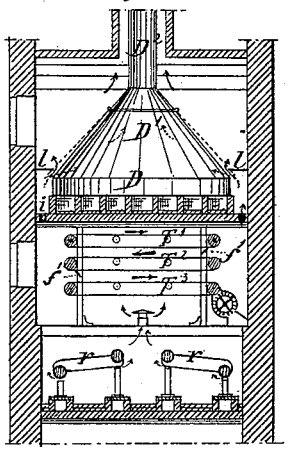
Fig. VIII.
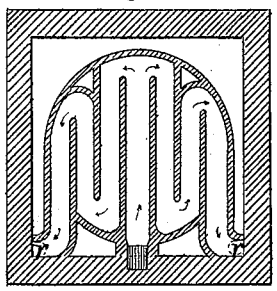
Fig. VII.
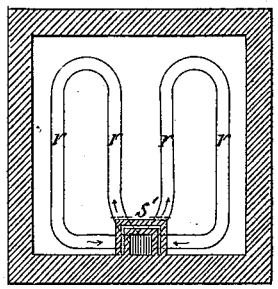
Fig. IX.
Witnesses:
Robt. H. Roy.
W. J. Bell.
Inventor:
Henry Hencke
by his attorney
Hauk of Biesen (No Model.) 2 Sheets—Sheet 2.
H. HENCKE.
PROCESS OF AND APPARATUS FOR PRODUCING FODDER FROM RESIDUAL PRODUCTS OF DISTILLERIES AND BREWERIES.
No. 316,145. Patented Apr. 21, 1885.
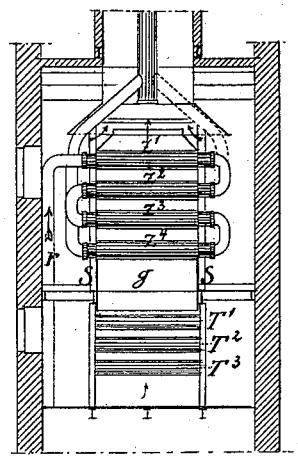
Fig. X.
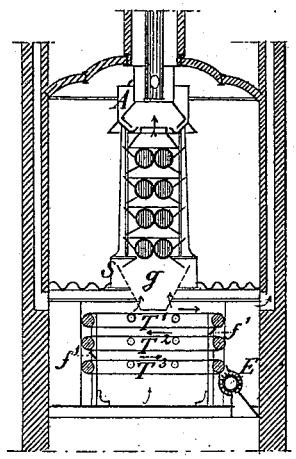
Fig. XI.
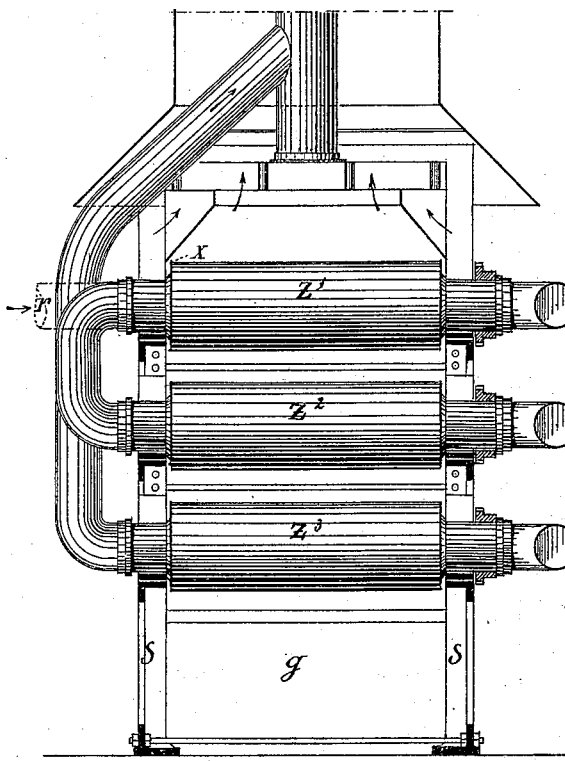
Fig. XII.
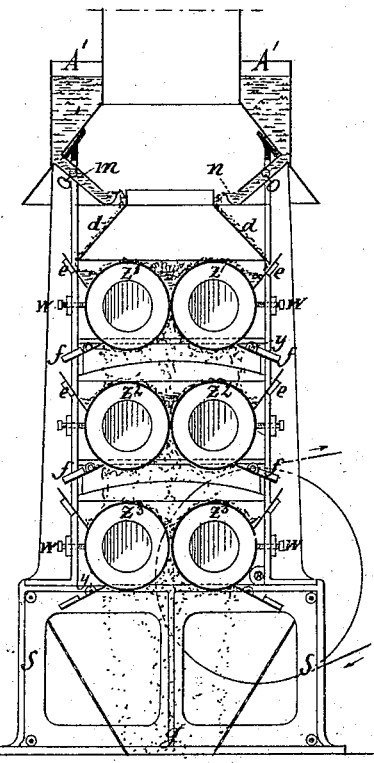
Fig. XIII.
Witnesses:
Robt H. Roy
W. J. Bell
Inventor:
Henry Hencke
by his attorney
Frank P. Friesen

UNITED STATES PATENT OFFICE.

HENRY HENCKE, OF GRUNECK, GERMANY.

PROCESS OF AND APPARATUS FOR PRODUCING FODDER FROM RESIDUAL PRODUCTS OF DISTILLERIES AND BREWERIES.

SPECIFICATION forming part of Letters Patent No. 316,145, dated April 21, 1885.

Application filed July 23, 1884. (No model.)

*To all whom it may concern:*

Be it known that I, HENRY HENCKE, of Gruneck, Germany, have invented a new Process of and Apparatus for Producing Fodder from Residual Products of Distilleries and Breweries, of which the following specification is a full, clear, and exact description.

This invention relates to an improved process of producing fodder from the residual products of distilleries, breweries, and sugar and starch factories, and to the apparatus for carrying out such process, which is illustrated in the accompanying sheets of drawings, in which—

Figure 1 is a vertical section of the waste-receiving vat; Fig. 2, a longitudinal vertical section of the decanting-cock; Figs. 3, 4, and 5, detail views of a modification of the same; Fig. 6, a vertical longitudinal section of the apparatus for carrying on occasional evaporation and drying; Fig. 7, a horizontal section of the same. Figs. 8 and 9 are similar views of a modification of the apparatus shown in Figs. 6 and 7. Figs. 10 and 11 are respectively vertical longitudinal and vertical cross sections of another modification used for continual evaporation and drying. Figs. 12 and 13 are enlarged sectional views of the same without the drying-aprons.

The residual product, waste, or wash is first placed in a vat, A, Fig. 1, and mixed with a glutinous solution obtained by solving five to twenty-five grams of mica, gelatine, and glue in one liter of boiling water. This solution is placed in a vessel (not shown in the drawings) and connected by a pipe, $a$, to two perforated arms, $a'$, above tank A. The pressure of the fluid causes the rotation of these arms and the proper discharge of the solution into the tank A; but the arms $a'$ may be rotated by mechanical means. For every hectoliter of wash one liter of the glutinous solution should be taken. The mixture is left in the vat for about thirty hours, when the albuminous particles will settle at the bottom, together with the husks and other heavier residue, while the water rises to the top.

To draw off the water a decanting-cock is used, which can be adjusted vertically, so that it will take out all the water up to the lowest water-line. Fig. 2 illustrates one kind of these cocks. Figs. 3, 4, and 5 are respectively a front view, section, and detail view of mouthpiece of a modification. In Fig. 2 the cock $b$ is by coupling $b^2$ connected to pipe $b'$ within the vat. This pipe is embraced by a sleeve, $b^3$, free to slide up and down on pipe $b'$, and held in the position in which it is set by friction or otherwise. The mouth at the top of this sleeve $b^3$ is placed in line with the lowest water-line, so that all water is discharged through cock $b$. A gage-glass in front of sleeve $b^3$ permits the proper adjustment of this sleeve.

In Figs. 3, 4, and 5, $c$ is an upright disk fitted into side of vat A, and free to revolve in annular frame $c'$. $c^2$ are gage-glasses inserted into the disk. A cock, $c^3$, having mouth $c^4$, is attached to disk $c$, and by revolving the disk more or less the cock may be correspondingly raised or lowered. Clamp-screws $c^5$ hold disk $c$ properly in place. After the water has been removed from vat A by means just described, the heavy residue that has remained in the vat is deoxidized by means of carbonate of lime, which is mixed in proportion of 0.25 to 0.50 kilograms to every hectoliter of wash.

The apparatus for evaporating and for drying the residue is illustrated in Figs. 6 and 7, if to be carried on occasionally, and also in Figs. 8 and 9, which show a modification of such apparatus.

Before the wash is introduced into the evaporator it is neutralized by a slight sprinkling with carbonate of soda. The wash is laid in thin layers upon the evaporator D, and heated by means of hot gases, which circulate under the evaporator. To prevent burning and to facilitate the generation of steam, the product is continually stirred. The steam from evaporator D passes through dome D' into pipe $D^2$, and thence into the open air. When a sufficient degree of dryness and consistency is obtained, the product is removed to the upper floor, and there spread in thin layers upon drying pans or surfaces T' $T^2$ $T^3$. Here the product is dried by the hot air coming from below and generated by a calorifier, or along the tubes $r$, which carry the products of combustion into the chimney. The evaporating and drying apparatus shown in Figs. 8 and 9 only differs from the one just described in having the evaporator placed above the drying-pans. Here, also, D is the evaporator, D' its dome, and $D^2$ the smoke-pipe. $T'$ $T^2$ $T^3$ are the drying-pans. $r$ are the hot-air pipes, and $s$ is a valve by which the heat may be made to go either direct to the upper evaporating apparatus, D, or to the pans $T'$ $T^2$. From evaporator D the evaporated water passes through openings $i$, between dome D' and frame $l$, into the chimney, as indicated by arrows.

In Sheet 2 Figs. 10 and 11 represent an apparatus to be used in place of the apparatus just described, if the evaporation and drying are to be carried on continuously and not occasionally. Figs. 12 and 13 are similar views on an enlarged scale, showing the same apparatus, but without endless aprons. The apparatus is supported by uprights $s$, and within it are arranged a number of hollow heating rollers or cylinders in pairs, $Z'$ $Z'$, $Z^2$ $Z^2$, and $Z^3$ $Z^3$, as shown, the uppermost pair being revolved with greater speed than the next pair, while the lowermost pair is revolved slowest.

A' is a tank at the top of the apparatus, into which the matter to be evaporated is placed, and in which it is slightly heated by the heat radiating from the cylinders. From tank A' the product is conducted through tubes $m$ and openings $n$ upon inclined plates $d$ $e$, where a further heating takes place, and finally it is passed on the uppermost rollers, $Z'$ $Z'$. All the cylinders may be heated directly by building a fire within them, or by hot air, steam, or in other manner. By the rotation of the cylinders toward each other a quantity of the wash is carried between them, and as in the contracted space between each pair of cylinders the heat is very great the evaporation will be very vigorous. The cylinders at the same time compress the wash, the water being pressed upward and quickly evaporated, while the more solid matter falls down.

$f$ are scrapers pivoted at $y$ and weighted at their outer end. They are used for taking the wash from the bottom of one pair of cylinders and throwing it upon the top of the set next below. $r$ are the hot-air pipes for conveying hot air to the cylinders and for discharging it into the chimney after use. From the lowermost pair of cylinders the product falls into a hopper, $g$, having perforated sides for the admission of air, and from thence it either leaves the machine or, Figs. 10 and 11, falls upon endless aprons $T'$ $T^2$ $T^3$, which slowly move around rollers for the purpose of providing a large surface on which the drying can be quickly and thoroughly completed. $f'$ are scrapers applied to aprons $T'$ $T^2$. The product moving along with the aprons falls gradually from one story to the other until it arrives at a triturating apparatus, E, after which it is thrown on the floor of a lower drying-room or into a collecting-funnel.

By the above apparatus a dry and durable fodder is obtained.

I claim as my invention—

1. The process of producing dry concentrated fodder from the residual products of distilleries, breweries, and sugar and starch factories, which consists in the decantation of the waste under admixture of a glutinous solution for precipitation of the albuminous and heavier particles, the deoxidation of the waste freed from water by addition of carbonate of lime, and the evaporation and drying of the waste mixed with carbonate of soda, substantially as specified.

2. In an apparatus for obtaining concentrated fodder from waste, the combination of cock $b$ with upright pipe $b'$ and sleeve $b^3$, adapted to slide on pipe $b'$, substantially as and for the purpose specified.

3. The combination of evaporator D with dome D' and pipe $D^2$, and with drying-pans $T'$ $T^2$ $T^3$ and heating-pipe $r$, substantially as specified.

4. The combination of tank A' with heating-cylinders $Z'$ $Z^2$ $Z^3$, arranged in pairs, and with scrapers $f$ and hopper $g$, substantially as specified.

5. The combination of tank A' with inclined plates $d$ $e$, rollers $Z'$ $Z^2$ $Z^3$, set-screws $w$, weighted pivoted scrapers $f$, and with perforated hopper $g$, substantially as herein shown and described.

HENRY HENCKE.

Witnesses:
G. DEDREUX,
JOHN PALM.